UNITED STATES PATENT OFFICE.

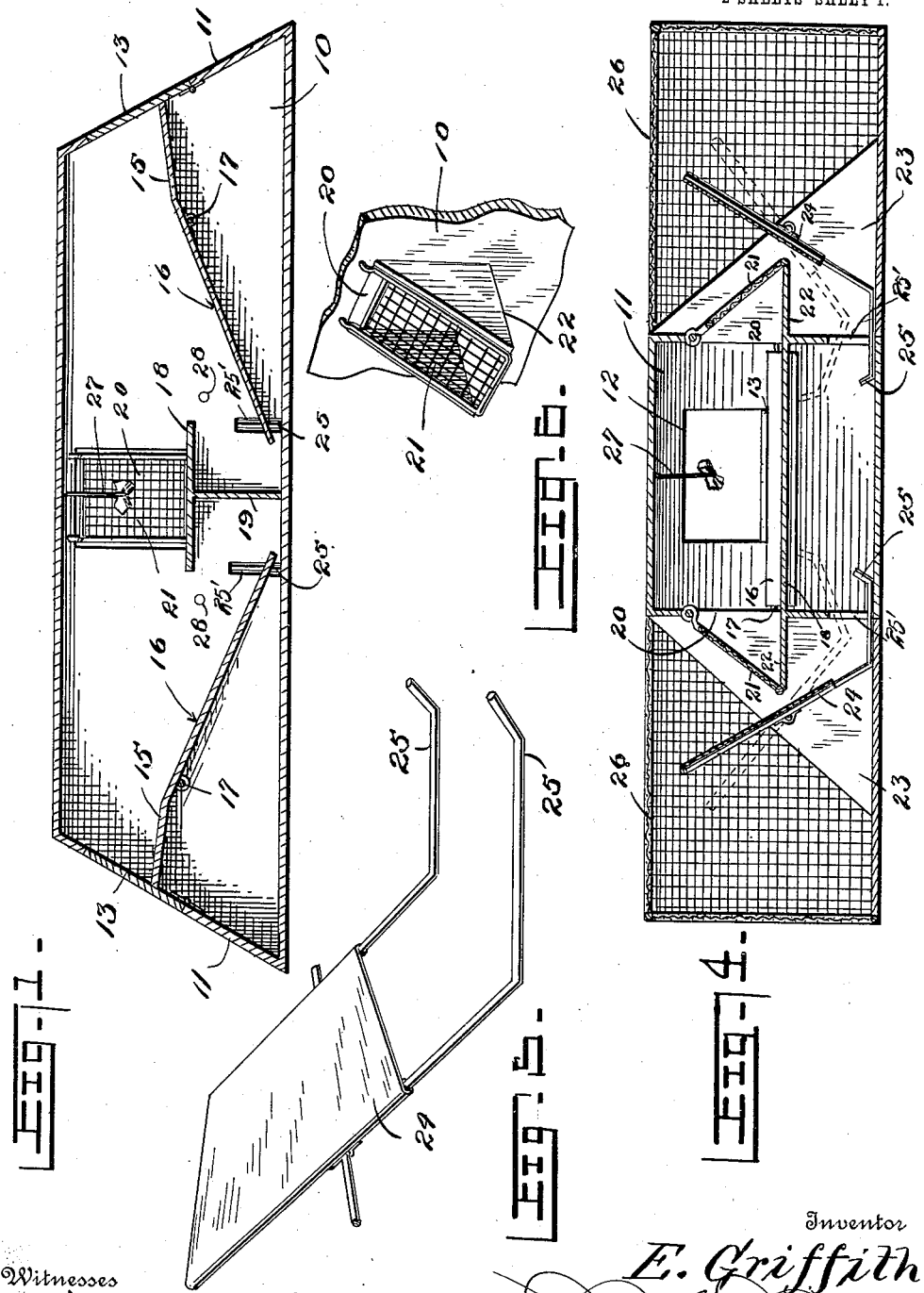

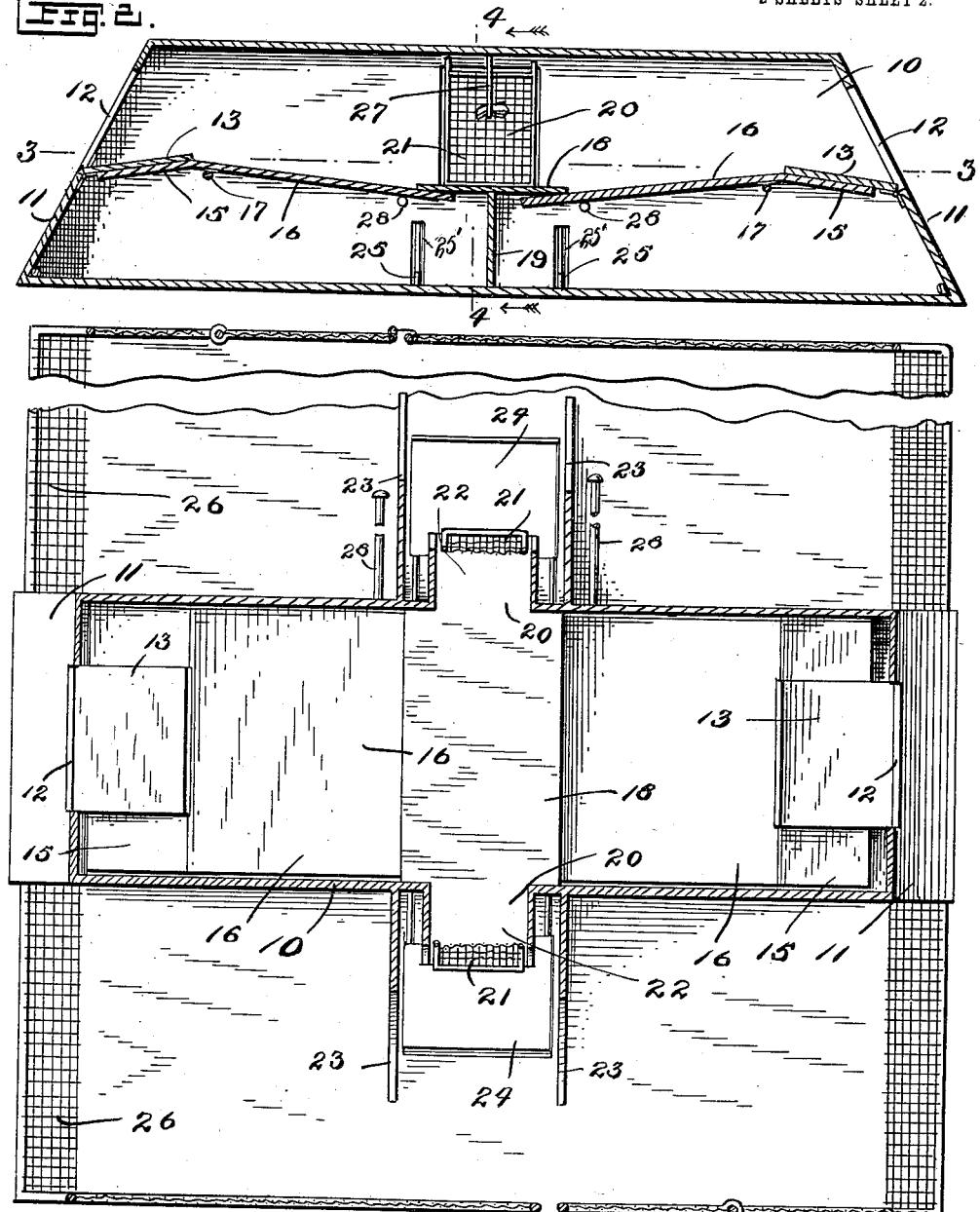

EDWIN GRIFFITH, OF GLYNDON, MARYLAND.

ANIMAL-TRAP.

1,068,894.

Specification of Letters Patent.

Patented July 29, 1913.

Application filed May 9, 1912. Serial No. 696,209.

*To all whom it may concern:*

Be it known that I, EDWIN GRIFFITH, a citizen of the United States, residing at Glyndon, in the county of Baltimore, State of Maryland, have invented certain new and useful Improvements in Animal-Traps; and I do hereby declare the following to be a full, clear, and exact description of the invention, such as will enable others skilled in the art to which it appertains to make and use the same.

This invention relates to traps and more particularly to rat traps and has for an object to provide a trap within either end of which the rodent may enter, the trap being so constructed that as the rodent treads upon the gang way after entering, the door will be automatically closed and prevent escape of the victim.

Another object is to provide a trap of this character having swinging doors in the sides thereof through which the victim may find its way and a trip outwardly of each door upon which the victim must step upon its way to the wired inclosure to either side of the trap, the trip serving to reset the trap for the next victim.

With the above and other objects in view the invention consists of certain novel details of construction and combination of parts hereinafter described and claimed; it being understood that various modifications may be made in the minor details of construction within the scope of the appended claims.

In the accompanying drawings forming part of this specification: Figure 1 is a longitudinal vertical section through the trap. Fig. 2 is a longitudinal vertical section through the device, set for operation. Fig. 3 is a horizontal cross sectional view on the line 3—3 of Fig. 2. Fig. 4 is a vertical cross sectional view on the line 4—4 Fig. 2. Fig. 5 is a detail view of one of the trips. Fig. 6 is a detail view of one of the wire swinging doors and platform at the side of the trap, said view also including a fragment of the side.

Referring now to the drawings in which like characters of reference designate similar parts, 10 designates the body of the trap which is preferably square in cross section and has the slanting ends 11 provided with the openings 12, said ends slanting downwardly in opposite directions.

Pivoted to the lower edge of each opening 12 is a door 13 which normally rests upon the outer end 15 of the gang way 16, said gang way being pivoted at the point 17, near the end of the body 10. The gang ways 16 have their inner ends spaced a short distance apart and normally engaged against the under face of the platform 18 which is located centrally within the body 10 and extends to the opposite sides thereof, said platform being supported by the short vertical transverse partition 19, the platform being spaced a short distance above the floor of the body.

Within each side of the body 10 is an opening 20 to the upper edge of which is pivoted a transparent door 21 which may be formed of any suitable material, glass, wire mesh or the like and is normally held in a slanting position with its lower edge resting against the outer edge of the platform extension 22, outwardly of the side of the body.

Extending outwardly from each side upon opposite sides of the door opening 20 are the parallel trip supports 23 between which are pivoted the trips 24 said trips being normally held at substantially right angles to the doors 21. Each trip 24 carries the fingers 25 projecting from its lower edge and into guide slots 25′ formed in the sides of the body 10, beneath the inner ends of the gang ways 16, the free ends of said fingers being directed upwardly for engagement against the under face of said inner ends of the gang ways.

Extending from each side of the body 10 is a wire frame work 26 and inclosing the trips 24 and their supports 23, said wire frame work forming an inclosure within which the victim may remain until removed therefrom, after passing through the door way 20 by forcing the door outwardly and treading upon the trip 24, causing the trip to swing upon its pivot and reset the trap, as will be later clearly understood.

A suitable bait is placed upon the bait hook 27 which depends centrally from the top of the body 10, and the trap set for the victims, as will be clearly understood. As both doors 13 are open, the rodent may readily see the bait from either end of the trap and will also be able to look straight through the trap. He will step upon the open door 13 and then upon the gang way 16 in his endeavor to reach the bait. As he moves along the gang way 16, the latter will swing upon its pivot 17, causing the inner end of said gang way to move toward the floor of the body 10 while the outer end presses the door 13 upwardly to close the door opening 12. The victim will then endeavor to leave by way of the opposite end, treading upon the other gang way 16, causing the inner end of this gang way to move toward the floor of the body 10 while its outer end closes the door 13 resting thereupon. The closing of the doors 13 making escape from either end of the body member 10, impossible, will cause the victim to seek another exit. Observing the side doors 21, the victim will mount the platform 18 and force one of the doors 21 outwardly, said victim moving upon the platform extension 22 and finally stepping upon the trip 24, causing the same to rock upon its pivot between the supports 23, the victim then landing in the inclosure to the side of the trap. The door 21 will automatically return to its normal position and the swinging of the trip 24 will cause the fingers 25 to engage the under face of the gang way 16, and force the inner ends thereof upwardly against the platform 18, permitting the doors 13 to drop to their normal positions upon the outer ends of the gang way 16, thus automatically resetting the trap for the next victim. It will be understood that the frame work 26 may be removably secured to the sides of the body 10 or that a door may be provided in the frame work for the purpose of removing the victims from the inclosure.

If desired, suitable locking pins 28 may be passed through the trap transversely, beneath the inner ends of the gang way 16 to lock the trap in set position and thus prevent the inner ends of the gang way 16 from moving toward the bottom of the body 10 and thus closing the doors 13, when it is desired to render the trap temporarily inoperative.

What is claimed, is:—

1. A device of the class described comprising the combination with a body having entrance openings in its opposite sides, a platform positioned in said body member between the openings, doors at opposite ends of the bottom member, trips between the doors and the center of the body member, said trips being pivoted and the ends thereof projecting beneath the platform, said platform limiting the upward movement of the inner ends of the trips, the trips automatically closing the doors upon downward movement of the inner ends of said trips.

2. An animal trap comprising a body member, a vertical transverse partition positioned centrally therein, a platform upon the upper edge of the partition, exit openings in the sides of the body member at the opposite ends of the platform, a casing inclosing the body member, doors in the opposite ends of the body member, pivoted trip members extending from adjacent the doors to points below the platform, said trips when in operative position being adapted to receive the doors upon their outer ends while their inner ends engage the under face of the platform, said trips when swung upon their pivots automatically closing the doors, and means for returning the trips to their normal position.

In testimony whereof, I affix my signature, in presence of two witnesses.

EDWIN GRIFFITH.

Witnesses:
A. J. LENTZ,
EDW. NOPPENBERGER.

---

Copies of this patent may be obtained for five cents each, by addressing the "Commissioner of Patents, Washington, D. C."